US009043775B2

(12) United States Patent
Emani et al.

(10) Patent No.: US 9,043,775 B2
(45) Date of Patent: May 26, 2015

(54) METHOD FOR IDENTIFYING PROBLEMATIC LOOPS IN AN APPLICATION AND DEVICES THEREOF

(71) Applicant: Infosys Limited, Bangalore (IN)

(72) Inventors: Murali Krishna Emani, Hyderabad (IN); Sudeep Mallick, Bangalore (IN); Balkrishna Prasad, Bangalore (IN)

(73) Assignee: Infosys Limited, Bangalore (IN)

( * ) Notice: Subject to any disclaimer, the term of this patent is extended or adjusted under 35 U.S.C. 154(b) by 133 days.

(21) Appl. No.: 13/622,811

(22) Filed: Sep. 19, 2012

(65) Prior Publication Data

US 2013/0074059 A1    Mar. 21, 2013

(30) Foreign Application Priority Data

Sep. 20, 2011    (IN) ............................ 3242/CHE/2011

(51) Int. Cl.
*G06F 9/45*        (2006.01)
*G06F 9/44*        (2006.01)

(52) U.S. Cl.
CPC .. *G06F 8/452* (2013.01); *G06F 8/75* (2013.01)

(58) Field of Classification Search
USPC ................................................ 717/150, 158
See application file for complete search history.

(56) References Cited

U.S. PATENT DOCUMENTS

| 6,347,366 | B1 * | 2/2002 | Cousins ........................ 711/170 |
| 6,654,952 | B1 * | 11/2003 | Nair et al. ...................... 717/157 |
| 7,412,684 | B2 * | 8/2008 | Gutberlet et al. ............. 716/101 |
| 7,428,731 | B2 * | 9/2008 | Wu et al. ........................ 717/158 |
| 2003/0005404 | A1 * | 1/2003 | Bowyer et al. .................. 716/18 |
| 2003/0097652 | A1 * | 5/2003 | Roediger et al. .............. 717/160 |
| 2006/0004996 | A1 * | 1/2006 | Gonion ........................... 712/241 |
| 2006/0230392 | A1 * | 10/2006 | Duale et al. .................... 717/130 |
| 2008/0300851 | A1 * | 12/2008 | Chakrabarti et al. ........... 703/22 |
| 2009/0222786 | A1 * | 9/2009 | Malcolm ........................ 717/100 |

OTHER PUBLICATIONS

Christopher Healy, Mikael Sjodin, Viresh Rustag, & David Whalley, Bounding Loop Iterations for Timing Analysis, Jun. 1998, Proceedings of the IEEE Real-Time Technology and Application Systems, pp. 12-21.*
Healy et al., Bounding Loop Iterations for Timing Analysis, Real-Time Technology and Applications Symposium, 1998.*
Moseley et al., Identifying Potential Parallelism via Loop-Centric Profiling, CF '07, May 7-9, 2007.*
Suresh et al., Profiling Tools for Hardware/Software Partitioning of Embedded Applications, LCTES '03, Jun. 11-13, 2003.*
Healy et al., Bounding Loop Iterations from Timing Analysis, Real-Time Technology and Applications Symposium, 1998.*

* cited by examiner

*Primary Examiner* — Don Wong
*Assistant Examiner* — Reshaun M Finkley
(74) *Attorney, Agent, or Firm* — LeClairRyan, a Professional Corporation

(57) ABSTRACT

This invention relates to a method, computer readable medium, and apparatus for identifying one or more problematic loops in an application. This invention provides a Directed Acyclic Graph or DAG representation of structure of one or more loops in the application by performing a static and a dynamic analysis of the application source code and depicts the loop information as LoopID, loop weight, total loop iteration, average loop iteration, total loop iteration time, average loop iteration time and embedded vector size. This aids a programmer to concentrate on problematic loops in the application and analyze them further for potential parallelism.

15 Claims, 4 Drawing Sheets

METHOD FOR IDENTIFYING PROBLEMATIC LOOPS IN AN APPLICATION AND DEVICES THEREOF

This application claims the benefit of Indian Patent Application Filing No. 3242/CHE/2011, filed Sep. 20, 2011, which is hereby incorporated by reference in its entirety.

FIELD

The present invention relates to identifying problematic loops in an application, and particularly, to a method for identifying problematic loops in an application.

BACKGROUND

With the advent of parallel hardware and grid computing systems, the current trend in distributed and parallel computing industry is progressing in two paths simultaneously; one to develop applications with parallelism in place right from start and other is to exploit inherent parallelism already existing in applications. The latter challenge is more important for enterprise today where software applications in different verticals and horizontal domains are in need of tools or products that enable them to leverage the potential parallel hardware. The initial step in this process is to identify the potential areas of parallelism in the application. Loops, in general, are targets for potential parallelism. So for a programmer it is often needed to have a clear picture of the loop structure in place where each loop is associated with some metric to identify its degree of complexity with the rest of the application. Loops that are more cluttered are those which need to be analyzed for potential parallelism to ease out the execution for better performance.

The focus of software application developers who work on migrating applications to parallel hardware or grid network is to find out the portions of the code which is involving lot of computation time. Parallelizing these heavy sections of code will reduce the effective execution time and increased efficiency. Two dimensions of identifying these portions in the code exist where one is at task level. Here, modules of code needed to be analyzed for any inter-dependencies and such identified independent modules can be deployed in grid environment or parallel hardware such as multicore machines. Other dimension is at identifying heavy loops as these are most susceptible for parallel execution. Such identified heavy and potential parallel loops can be split across parallel processing units and then execute data partitions in parallel. So the initial task for the parallelizing loops is identifying loops that are heavy and show parallelistic features.

Although there are number of solutions available in the market for data parallelism but there are a number of disadvantages associated with these solutions. One of the disadvantages is that the current analysis techniques are focused on all loops present in the application irrespective of their complexity. This is time consuming as not all loops are problematic that cause bottleneck in the application execution. Manual analysis of the same is time consuming and error-prone. Further, programs designed with constructs directives to parallelize loops which can be directly detected and executed in parallel but legacy applications that were designed and implemented with no such provision pose biggest challenge in parallelizing them.

In view of the foregoing discussion, there is a need for identifying only the problematic loops in an application which can be analyzed further for potential parallelism in contrast with analyzing every loop in an application.

SUMMARY

The present invention discloses a method for identifying problematic loops in an application. The method includes associating one or more loops in the application with a Loop ID, a Loop Iteration Counter, a Loop Increment Counter, a Nested Loop Condition and a Nesting Level. The Loop ID is an unique ID that identifies a loop in the application; loop iteration counter keeps track of the total number of iterations a loop is executed; loop increment counter stores increment for the loop; nested loop condition is a Boolean variables that stores if a loop is nested or not; nesting level depicts the depth to which a loop is nested. In accordance with an embodiment of the present invention a loop Directed Acyclic Graph (Loop-DAG) of one or more loops present in the application is generated by performing static and dynamic analysis of the application. The loopDAG is generated only if at least one loop is present in the application. Thereafter, from the Loop-DAG loop weight information is collected. The loop weight is regarded as percentage of a loop execution time with respect to whole program execution time. Subsequently, one or more problematic loops in the application are identified from the LoopDAG. A loop having a higher loop weight is considered as problematic loop.

The present invention further discloses an apparatus for identifying problematic loops in an application. As disclosed the apparatus includes a static analyzer, a dynamic analyzer, a Directed Acyclic Graph generation module, a loop weight determining module. A static analyzer is configured for parsing an application to extract information relating to one or more loops of the application and their hierarchical structures. The static analyzer includes a code instrumentor for capturing structural information related to one or more loops, and one or more loop weights. Then, a dynamic analyzer configured to dynamically analyze the application to collect the time required to process a loop in the application. Thereafter, a Directed Acyclic Graph generation module generates a loop Directed Acyclic Graph (LoopDAG) of the application. Lastly, a loop weight determining module determines percentage of a loop execution time with respect to whole program execution time.

Additionally, the present invention discloses a non-transitory computer readable medium having stored thereon instructions for identifying problematic loops in an application, comprising machine executable code which when executed by a processor, causes the processor to perform steps comprising associating one or more loops in the application with a Loop ID, a Loop Iteration Counter, a Loop Increment Counter, a Nested Loop Condition and a Nesting Level. A Loop Directed Acyclic Graph (LoopDAG) of one or more loops of the application is generated by performing static and dynamic analysis. Loop weight information is collected from the LoopDAG, wherein the loop weight denotes percentage of a loop execution time with respect to whole program execution time. One or more loops are denoted as problematic loops in the application on the basis of an associated loop weight.

DRAWINGS

Various embodiments of the invention will, hereinafter, be described in conjunction with the appended drawings provided to illustrate, and not to limit the invention, wherein like designations denote like elements, wherein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure provide a method, non-transitory computer readable medium, and apparatus for identifying one or more problematic loops in an application, where one or more loops are assigned with Loop ID to identify a particular loop. In addition to Loop ID a loop is associated with a loop iteration counter, a loop increment counter, a nested loop condition and a nesting level. The disclosure also provides the method for generating loop directed acyclic graph (LoopDAG) by performing a static and a dynamic analysis of the application source code. This LoopDAG provides information about loop weight of one or more loops present in the application to facilitate the identification of one or more problematic loops based on an associated loop weights.

Figure 1:
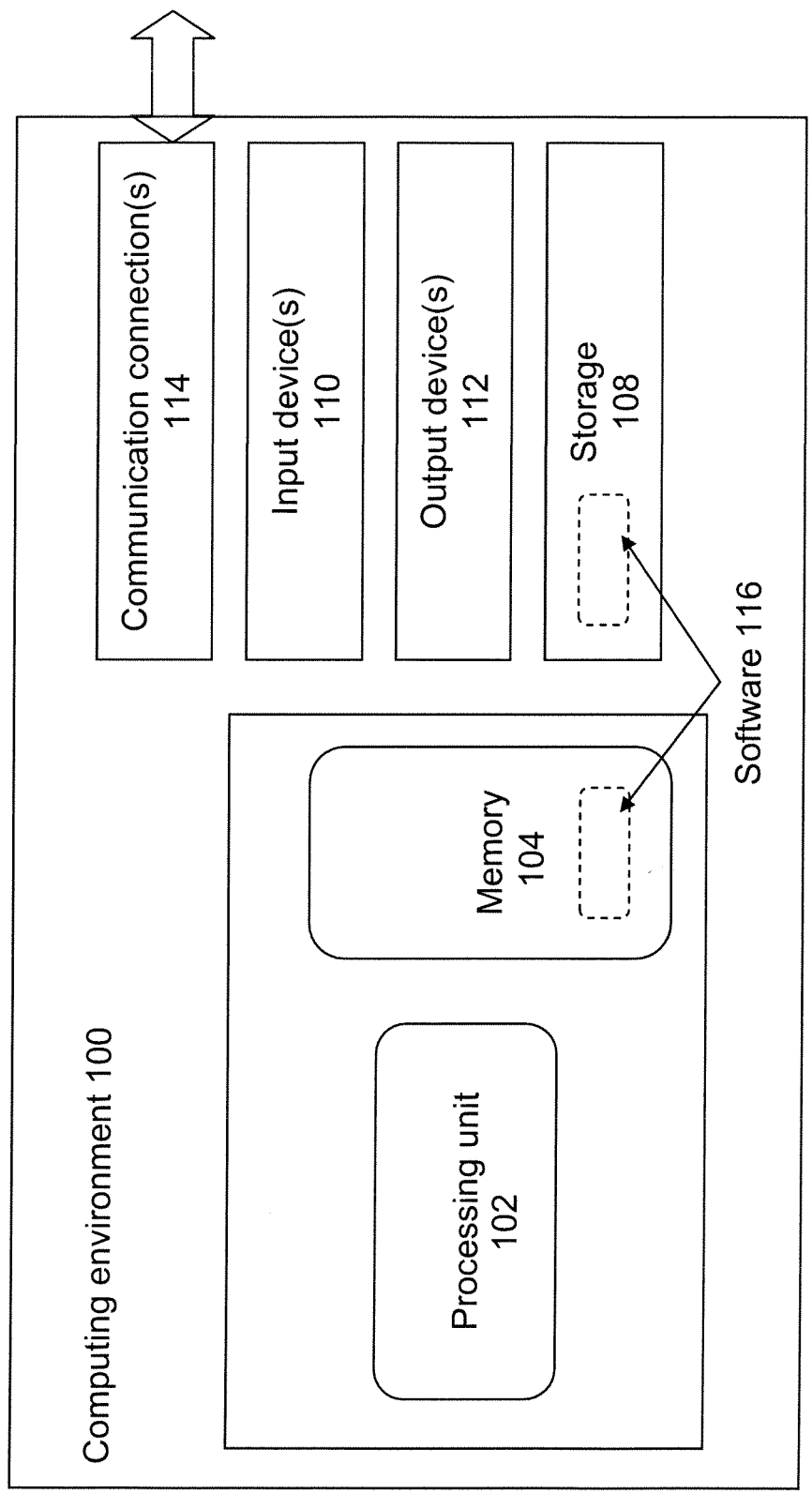
FIG. 1 is a computer architecture diagram illustrating a computing environment capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can, for example, implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
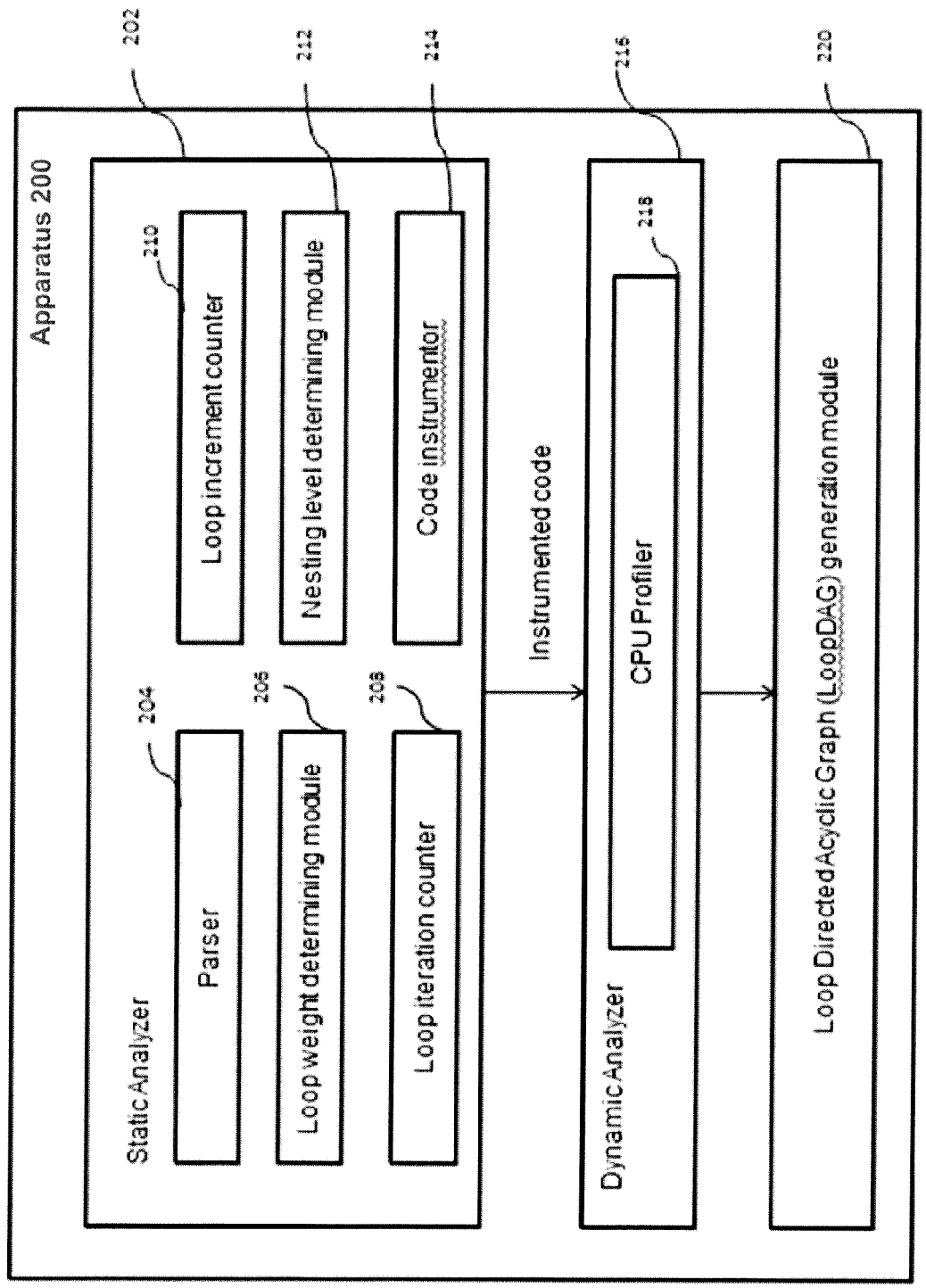
FIG. 2 is a block diagram, illustrating an apparatus for identifying one or more problematic loops in an application, in accordance with an embodiment of the present invention.

FIG. 2 is a block diagram, illustrating an apparatus 200 for identifying one or more problematic loops in an application, in accordance with an embodiment of the present invention. More particularly, in FIG. 2 the apparatus 200 includes a static analyzer 202, a dynamic analyzer 216 and a Loop Directed Acyclic Graph (LoopDAG) generation module 220. In various embodiments of the present invention, the static analyzer 202 parses the application source code to extract information related to one or more loops and their nested structure in order to generate a LoopDAG corresponding to the application. The static analyzer 202 comprises of a parser 204, a loop weight determining module 206, a loop iteration counter 208, a loop increment counter 210, a nesting level determining module 212 and a code instrumentor 214. The parser 204 parses the application source code to collect loop weight information of one or more loops present in the application. Parsers which are well known in the art may be used for parsing the application source code.

The loop weight determining module 206 determines loop weight of one or more loops in the application. The loop weight is defined as percentage of a loop execution time with respect to a whole program execution time. Higher percentage denotes that the greater computation involved in that loop, i.e, the loop is complex or problematic. One or more problematic loops are identified by the above mentioned method and analyzed further to find an opportunities of parallelism in these problematic loops. If the problematic loops are found parallelizable i.e. one or more loop iterations are independent and there exists no dependencies, then these iterations can be executed in parallel in grid platform or in parallel environment.

The loop iteration counter 208 counts the total number of iterations a loop is executed. The loop increment counter 210 stores an increment for one or more loops. The nesting level determining module 212 determines the depth of one or more nested loops and includes a Boolean variable that stores information related to one or more nested loops. The code instrumentor 214 inserts instrument strings into the parsed application source code to capture information related to loop structure and loop weight of one or more loops in the application. The instrument strings inserted by the code instrumentor 214 is used during a dynamic analysis of the application source code. Static analysis alone cannot collect all the information required for generation of a LoopDAG as some application tasks may change during execution of the application. Hence, dynamic analyzer 216 collects loop weight information related to one or more loops in the application by running the instrumented code. The dynamic analyzer 216 includes a CPU profiler 218 that determines one or more loop execution time.

The Loop Directed Acyclic Graph (LoopDAG) generation module 220 generates the LoopDAG of the application source code and that graph denotes a percentage of the execution time of one or more loops, a total number of loop iterations, a total loop time, an average loop time, an average loop iteration and an embedded vector size. The embedded vector size is calculated by dividing total number of loop iterations and average loop iteration.

Figure 3:
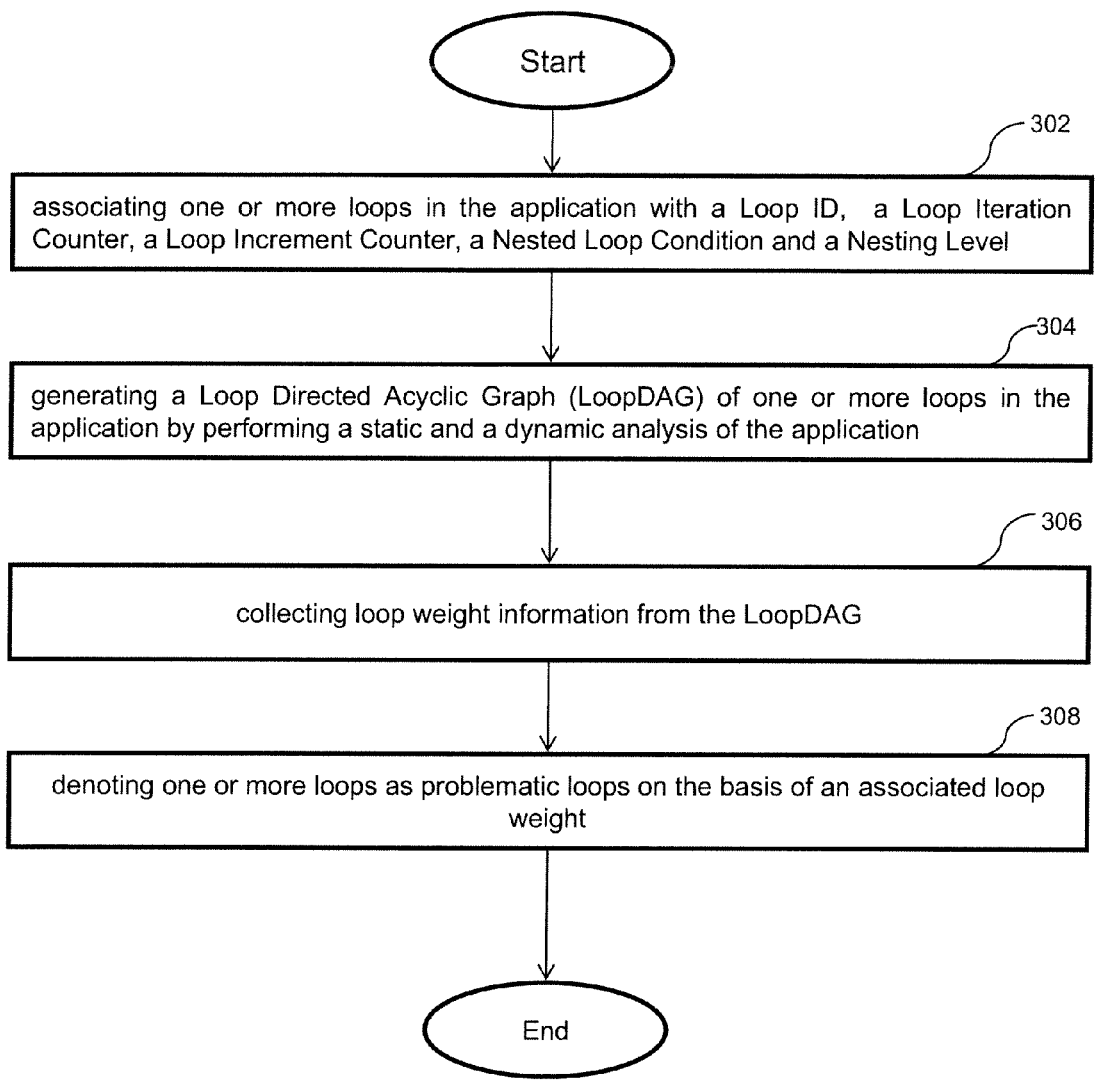
FIG. 3 is a flowchart, illustrating a method for identifying one or more problematic loops in an application, in accordance with an embodiment of the present invention.

FIG. 3 is a flowchart, illustrating a method for identifying one or more problematic loops in an application, in accordance with an embodiment of the present invention. The method includes associating one or more loops in the application with a loop ID, a loop iteration counter, a loop increment counter, a nested loop condition and a nesting loop level, at 302. The loop ID is a unique ID that identifies a loop. According to an embodiment of the present invention, the loop ID is represented as "Enclosing Package Name::Enclosing Class Name::Line number". The loop iteration counter counts the total number of iterations a loop is executed. The loop increment counter stores an increment for a loop. The nested loop condition includes a Boolean variable that stores if a loop is nested or not. The nesting level indicates the depth to which a loop is nested. After that, at 304, a Loop Directed Acyclic Graph (LoopDAG) of one or more loops present in the application is generated by performing static and dynamic analysis of the application. In static analysis the application source code is parsed to extract loop information for generating a LoopDAG. The static analysis further includes inserting an instrument string in the application for capturing information related to one or more loop structures and loop weights. This instrumented code is run in dynamic analysis to collect information related to loop weights of one or more loops in the application. The dynamic analysis for generating a LoopDAG comprises determining the time required for processing a loop in the application for obtaining loop weight. The LoopDAG is generated only if at least one loop is present in the application. Thereafter, at 306, loop weight information related to one or more loops are collected from the LoopDAG. The loop weight denotes percentage of a loop execution time with respect to a whole program execution time. In addition to loop weight information, the LoopDAG denotes a total number of loop iterations, a total loop time, an average loop time, an average loop iteration and an embedded vector size. The embedded vector size is calculated by dividing the total number of loop iterations and the average number of loop iteration. In accordance with an embodiment of the present invention, one iteration of a loop is executed to obtain the loop boundary. After this the loop is incremented to capture the maximum value of the loop iteration which is present in a condition checking statement and from these two steps the loop weight information may be obtained by multiplying the time taken to complete one loop iteration by the total number of loop iteration present in the condition checking statement. Other approaches to obtain a value of loop weight of one or more loops in the application include, but not limited to, mathematical methods and code coverage analysis which are commonly known by an ordinary person skilled in the art. After that, at 308, one or more loops are denoted as problematic loops on the basis of an associated loop weight. The percentage of a loop execution time with respect to a whole program execution time is the indicator for problematic loops. The higher this value, greater the computation involved in that loop. After identifying the problematic loops they are analyzed further for parallelism. If they are found to be parallelizable i.e. the loop iterations are independent and there exists no dependencies, these iterations can be executed in parallel either on a grid platform or on a parallel hardware.

Figure 4:
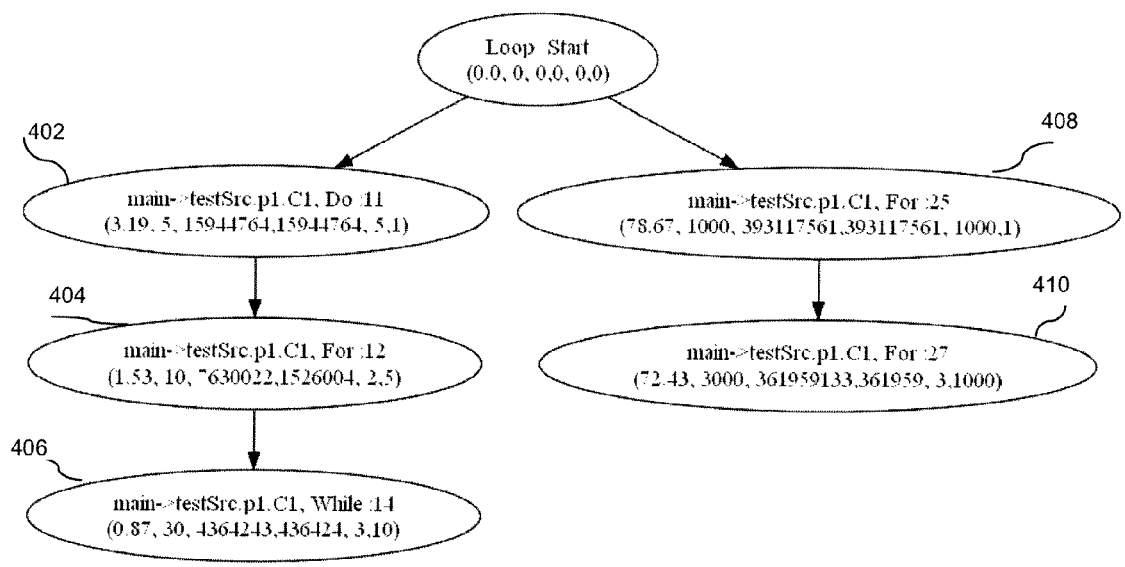
FIG. 4 illustrates a Loop Directed Acyclic Graph (Loop-DAG) of an application source code.

A sample source code with one or more basic loops for generating a LoopDAG is shown in Appendix A and the FIG. 4 illustrates a Loop Directed Acyclic Graph (LoopDAG) of the source code shown in Appendix A. At 402, main->testSrc.p1.C1, Do: 11 represents a loop ID, where, main->testSrc represents a project name, p1 represents a package name, C1 represents a class name, Do represents a loop type and 11 represents a line number. The details about the loop weight is denoted at 402, wherein the first digit i.e. 3.19 represents loop weight i.e. percentage of the loop execution time with respect to the whole program execution time, the second digit i.e. 5 represents the total number of loop iterations, the third digit i.e. 15944764 represents the time taken for total loop iteration in nanosecond, the fourth digit i.e. 15944764 represents the time taken for average loop iteration in nanosecond, the fifth digit i.e. 5 represents an average number of loop iteration and the sixth digit i.e. 1 represents an embedded vector size which is calculated by dividing the total number of loop iteration and average number of loop iteration. The embedded vector also represents the total number of loop calls. A loop can be called by one or more callers and the number of loop iterations may change based on one or more arguments used by the application and this is depended upon one or more condition statements of the application. The number of loop iteration may also change if a method or function containing a loop is called from one or more places. Thus it is required to know the average loop iteration to identify the problematic loop in the application. The average loop iteration is an average number of loop iterations during the whole program execution. The total loop iteration means the total number of calling for the loop irrespective of the caller. If a loop has been called from only one place the average loop iteration and total loop iteration will be same. The average loop iteration only varies from the total loop iteration if a loop is called from a plurality of places. In accordance with an embodiment of the present invention, loop information denotes one or more callers or methods in which a loop becomes problematic. Table 1 provides exemplary loop information which is collected from the static and dynamic analysis of the application source code.

TABLE 1

| Loop Weight | Loop ID | Caller | Total number of iterations | Total time taken (ns) | Average loop iterations | Average loop time (ns) | Number of loop calls (embedded vector size) |
|---|---|---|---|---|---|---|---|
| 0.07 | testSrc.p1.C1 For :82 | main | 10 | 688923 | 1 | 68892 | 10 |

TABLE 1-continued

| Loop Weight | Loop ID | Caller | Total number of iterations | Total time taken (ns) | Average loop iterations | Average loop time (ns) | Number of loop calls (embedded vector size) |
|---|---|---|---|---|---|---|---|
| 0.11 | testSrc.p3.C3 For :31 | testSrc.p1.C1::m3 [ ] | 10 | 1085056 | 1 | 108505 | 10 |
| 0.18 | testSrc.p3.C3 For :11 | testSrc.p1.C1::m2 [ ] | 31 | 1866774 | 1 | 60218 | 31 |
| 0.22 | testSrc.p3.C3 For :19 | testSrc.p1.C1::m2 [ ] | 31 | 2202092 | 1 | 71035 | 31 |
| 0.44 | testSrc.p3.C3 For :10 | testSrc.p1.C1::m2 [ ] | 31 | 4517369 | 1 | 145721 | 31 |
| 33.92 | testSrc.p1.C1 For :80 | main | 10 | 347374481 | 10 | 347374481 | 1 |
| 61.92 | testSrc.p1.C1 While :69 | main | 30 | 634130737 | 3 | 63413073 | 10 |
| 62.13 | testSrc.p1.C1 Do :66 | main | 5 | 636251287 | 5 | 636251287 | 1 |

Referring to Table 1, the loop ID testSrc.p1.C1 For: 82 has been called 10 times and the total number of iteration is 10. Thus the average loop iteration is 1. The time taken for total loop iteration is 688923 nanosecond and the time taken for average loop iteration is 68892 nanosecond. Similarly, the loop ID testSrc.p1.C1 For: 80 has been called for once and the total number of loop iteration is 10. Thus average number of loop iteration is also 10. The time taken for total loop iteration as well as for average loop iteration is 347374481 nanosecond. Thus this loop is more complex than the earlier. Further, the loop ID testSrc.p1.C1 Do: 66 has been called for once and having total as well as average loop iteration 5. The time taken for total as well as for average loop iteration is 636251287 nanosecond. Thus this loop is more complex compared to the earlier two loops. The information related to loop complexity is directly determined from the loop weight.

Referring back to FIG. 4, at 404, main->testSrc.p1.C1, For: 12 represents a loop ID, where, main->testSrc represents a project name, p1 represents a package name, C1 represents a class name, For represents a loop type and 12 represents a line number. The details about the loop weight is denoted at 404, wherein the first digit i.e. 1.53 represents loop weight i.e. percentage of the loop execution time with respect to the whole program execution time, the second digit i.e. 10 represents the total number of loop iterations, the third digit i.e. 7630022 represents the time taken for total loop iteration in nanosecond, the fourth digit i.e. 1526004 represents the time taken for average loop iteration in nanosecond, the fifth digit i.e. 2 represents an average number of loop iteration and the sixth digit i.e. 5 represents an embedded vector size. Again, at 406, main->testSrc.p1.C1, While: 14 represents a loop ID, where, main->testSrc represents a project name, p1 represents a package name, C1 represents a class name, While represents a loop type and 14 represents a line number. The details about the loop weight is denoted at 406, wherein the first digit i.e. 0.87 represents loop weight i.e. percentage of the loop execution time with respect to the whole program execution time, the second digit i.e. 30 represents the total number of loop iterations, the third digit i.e. 4364243 represents the time taken for total loop iteration in nanosecond, the fourth digit i.e. 436424 represents the time taken for average loop iteration in nanosecond, the fifth digit i.e. 3 represents an average number of loop iteration and the sixth digit i.e. 10 represents an embedded vector size. In FIG. 4, the loops mentioned at 402, 404 and 406 are nested and the LoopDAG shows the nesting level. Similarly, at 408, main->testSrc.p1.C1, For: 25 represents a loop ID, where, main->testSrc represents a project name, p1 represents a package name, C1 represents a class name, For represents a loop type and 25 represents a line number. The details about the loop weight is denoted at 408, wherein the first digit i.e. 78.67 represents loop weight i.e. percentage of the loop execution time with respect to the whole program execution time, the second digit i.e. 1000 represents the total number of loop iterations, the third digit i.e. 393117561 represents the time taken for total loop iteration in nanosecond, the fourth digit i.e. 393117561 represents the time taken for average loop iteration in nanosecond, the fifth digit i.e. 1000 represents an average number of loop iteration and the sixth digit i.e. 1 represents an embedded vector size. Again, at 410, main->testSrc.p1.C1, For: 27 represents a loop ID, where, main->testSrc represents a project name, p1 represents a package name, C1 represents a class name, For represents a loop type and 25 represents a line number. The details about the loop weight is denoted at 410, wherein the first digit i.e. 72.43 represents loop weight i.e. percentage of the loop execution time with respect to the whole program execution time, the second digit i.e. 3000 represents the total number of loop iterations, the third digit i.e. 361959133 represents the time taken for total loop iteration in nanosecond, the fourth digit i.e. 361959 represents the time taken for average loop iteration in nanosecond, the fifth digit i.e. 3 represents an average number of loop iteration and the sixth digit i.e. 1000 represents an embedded vector size. In FIG. 4 the loops mentioned at 408 and 410 are nested. From this LoopDAG it is determined that the loop having the maximum value of loop weight is the most complex loop in the application, i.e. the loop ID main->testSrc.p1.C1, For: 25 is the most complex loop in the application having loop weight of 78.67. this loop can be further analyzed for potential parallelism.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise.

The above mentioned description is presented to enable a person of ordinary skill in the art to make and use the invention and is provided in the context of the requirement for a obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A method for identifying one or more problematic loops in an application comprising:

generating, by an application analysis computing device, a Loop Directed Acyclic Graph of one or more loops in the application by performing a static and a dynamic analysis of the application, wherein the Loop Directed Acyclic Graph is generated when at least one of the loops is present in the application;

collecting, by the application analysis computing device, loop weight information from the Loop Directed Acyclic Graph, wherein the loop weight information denotes a percentage of a loop execution time with respect to a whole program execution time; and identifying, by the application analysis computing device, one or more of the one or more loops as problematic loops based on the collected loop weight information for the one or more loops from the Loop Directed Acyclic Graph, the problematic loops comprising a higher value of loop weight information than one or more other loops in the application.

2. The method of claim 1, wherein the static analysis for generating a Loop Directed Acyclic Graph comprises:

parsing of the application, by the application analysis computing device, to extract information about the one or more loops; and inserting, by the application analysis computing device, an instrument string in the application for capturing information related to one or more loop structures and loop weights.

3. The method of claim 1, wherein the dynamic analysis for generating a Loop Directed Acyclic Graph comprises determining, by the application analysis computing device, the time required for processing one of the one or more loops in the application for obtaining loop weight.

4. The method of claim 1, wherein the Loop Directed Acyclic Graph represents information related to one or more nested of the one or more loops in the application.

5. The method of claim 1, wherein the Loop Directed Acyclic Graph denotes a percentage of the execution time of one or more of the one or more loops, a total number of loop iterations, a total loop time, an average loop time, an average loop iteration and an embedded vector size.

6. An application analysis computing device comprising:
one or more processors;
a memory coupled to the one or more processors which are configured to execute programmed instructions stored in the memory comprising:

generating a Loop Directed Acyclic Graph of one or more loops in an application by performing a static and a dynamic analysis of the application, wherein the Loop Directed Acyclic Graph is generated when at least one of the one or more loops is present in the application;

collecting loop weight information from the Loop Directed Acyclic Graph, wherein the loop weight information denotes a percentage of a loop execution time with respect to a whole program execution time; and identifying one or more of the one or more loops as problematic loops based on the collected loop weight information for the one or more loops from the Loop Directed Acyclic Graph, the problematic loops comprising a higher value of the loop weight information than one or more other loops in the application.

7. The device of claim 6, wherein the dynamic analysis for generating a Loop Directed Acyclic Graph comprises determining the time required for processing one of the one or more loops in the application for obtaining loop weight.

8. The device of claim 6, wherein the Loop Directed Acyclic Graph denotes a percentage of the execution time of one or more of the one or more loops, a total number of loop iterations, a total loop time, an average loop time, an average loop iteration and an embedded vector size, wherein the embedded vector size denotes the total number of loop calls.

9. The device of claim 6, wherein the Loop Directed Acyclic Graph represents information related to one or more nested loops in the application.

10. A non-transitory computer readable medium having stored thereon instructions for identifying problematic loops for data parallelism in an application, comprising machine executable code which when executed by a processor causes the processor to perform steps comprising:

generating a Loop Directed Acyclic Graph of one or more loops in the application by performing a static and a dynamic analysis of the application, wherein the Loop Directed Acyclic Graph is generated if at least one loop is present in the application;

collecting loop weight information from the Loop Directed Acyclic Graph, wherein the loop weight information denotes a percentage of a loop execution time with respect to a whole program execution time; and identifying one or more of the one or more loops as problematic loops based on the collected loop weight information for the one or more loops from the Loop Directed Acyclic Graph, the problematic loops comprising a higher value of the loop weight information than one or more other loops in the application.

11. The computer readable medium of claim 10, wherein the static analysis for generating a Loop Directed Acyclic Graph comprises:

parsing of the application to extract information related to one or more of the one or more loops; and inserting an instrument string in the application for capturing information related to one or more loop structures and loop weights.

12. The computer readable medium of claim 10, wherein the dynamic analysis for generating a Loop Directed Acyclic Graph comprises determining the time required for processing a loop in the application for obtaining loop weight.

13. The computer readable medium of claim 10, wherein the Loop Directed Acyclic Graph represents information related to one or more nested loops in the application.

14. The computer readable medium of claim 10, wherein the Loop Directed Acyclic Graph denotes a percentage of the execution time of one or more of the one or more loops, a total number of loop iterations, a total loop time, an average loop time, an average loop iteration and an embedded vector size.

15. The device of claim 6 wherein the static analysis for generating a Loop Directed Acyclic Graph comprises:

parsing of the application to extract information related to one or more of the one or more loops; and inserting an instrument string in the application for capturing information related to one or more loop structures and loop weights.

* * * * *